United States Patent [19]

Tanaka

[11] Patent Number: 4,610,515
[45] Date of Patent: Sep. 9, 1986

[54] OBJECTIVE LENS FOR AN OPTICAL DISC
[75] Inventor: Masashi Tanaka, Kawasaki, Japan
[73] Assignee: Nippon Kogaku K.K., Tokyo, Japan
[21] Appl. No.: 590,772
[22] Filed: Mar. 19, 1984
[30] Foreign Application Priority Data
 Mar. 26, 1983 [JP] Japan .................. 58-50977
[51] Int. Cl.⁴ .................. G02B 9/12; G02B 21/02
[52] U.S. Cl. .................. 350/474; 350/414
[58] Field of Search .......... 350/474, 414, 410, 478
[56] References Cited
 U.S. PATENT DOCUMENTS
 2,206,195 7/1940 Konig ................. 350/410 X
 3,879,111 4/1975 Goto .................. 350/414
 4,184,747 1/1980 Uetake ............... 350/414
 FOREIGN PATENT DOCUMENTS
 188200 10/1907 Fed. Rep. of Germany ...... 350/478
 409465 5/1934 United Kingdom ............. 350/478
 139855 1/1961 U.S.S.R. ..................... 350/474

*Primary Examiner*—John K. Corbin
*Assistant Examiner*—Scott J. Sugarman
*Attorney, Agent, or Firm*—Shapiro and Shapiro

[57] ABSTRACT

An objective lens for recording information on an optical disc at high density or reproducing it comprises, in succession from the farther conjugate point side of the objective lens toward the nearer conjugate point side, first lens member consisting of a negative lens whose concave surface is directed toward the farther conjugate point side and a positive lens cemented together, second lens member of a positive lens and third lens member of a positive meniscus lens whose convex surface is directed toward the farther conjugate point side. A numerical aperture of the objective lens is 0.45 to 0.6 and the working distance thereof is long.

8 Claims, 30 Drawing Figures

FIG. 3A
SPHERICAL ABERRATION
FIG. 3B
ASTIGMATISM
FIG. 3C
DISTORTION
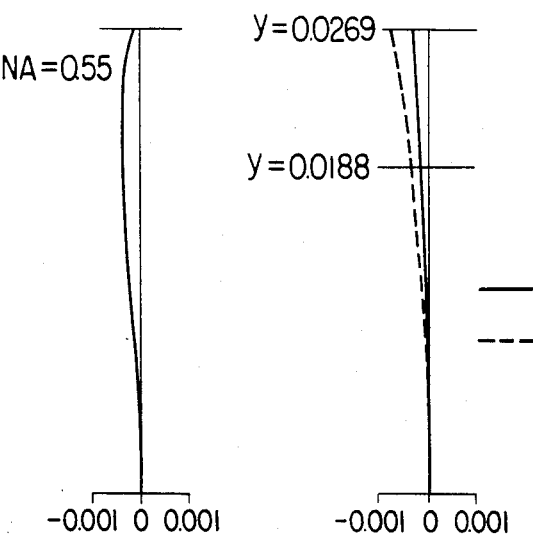
— SAGITTAL RAYS
--- MERIDIONAL RAYS
FIG. 3D
MERIDIONAL COMA
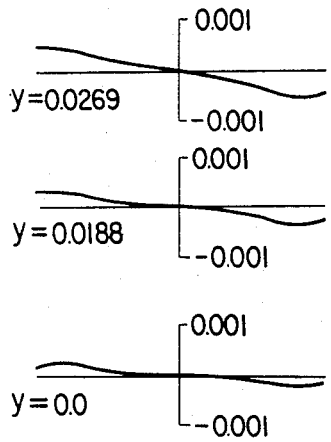

FIG. 4A
SPHERICAL ABERRATION
NA=0.5
-0.001 0 0.001
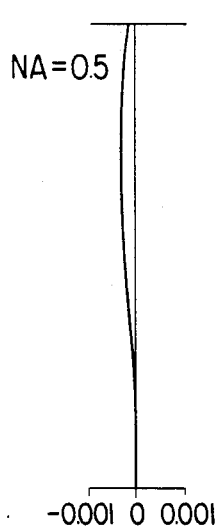
FIG. 4B
ASTIGMATISM
y=0.0227
——— SAGITTAL RAYS
- - - MERIDIONAL RAYS
-0.001 0 0.001
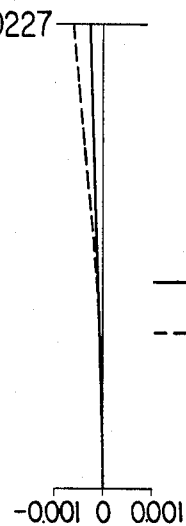
FIG. 4C
DISTORTION
y=0.0227
-0.1 0 0.1 (%)
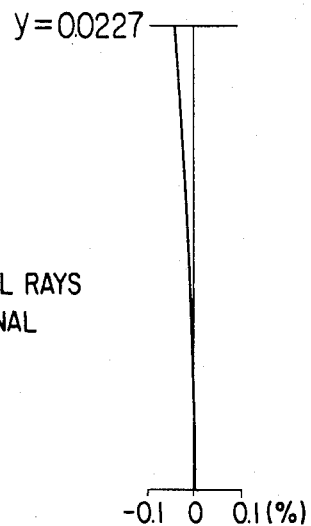
FIG. 4D
MERIDIONAL COMA
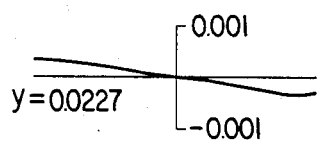
y=0.0227
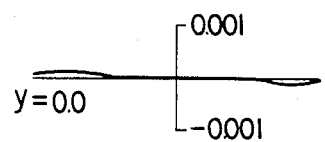
y=0.0

FIG. 5A SPHERICAL ABERRATION
FIG. 5B ASTIGMATISM
FIG. 5C DISTORTION
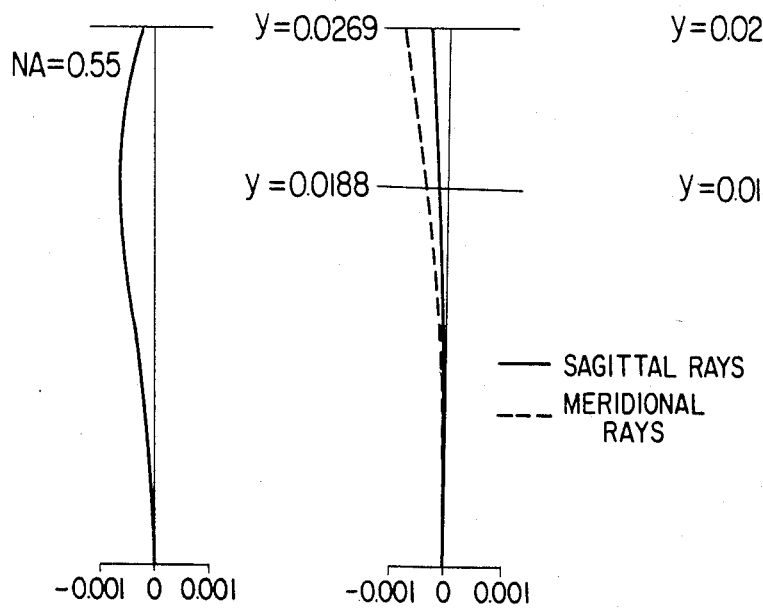
FIG. 5D MERIDIONAL COMA
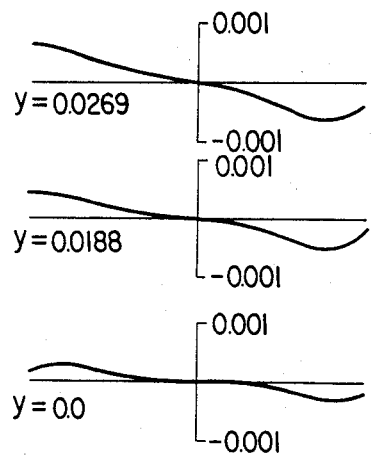

FIG. 6A
SPHERICAL ABERRATION
FIG. 6B
ASTIGMATISM
FIG. 6C
DISTORTION
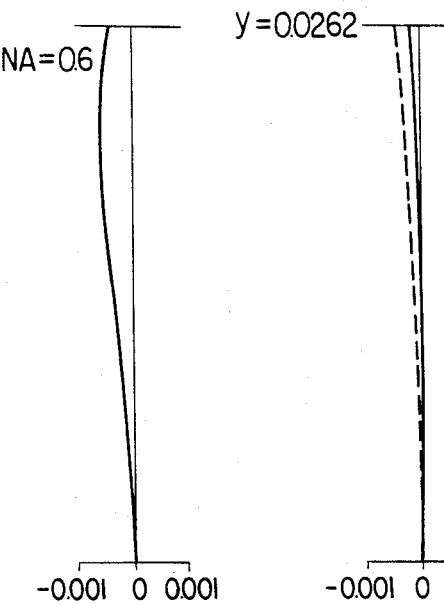
FIG. 6D
MERIDIONAL COMA
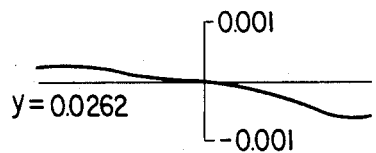
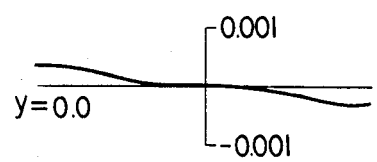

SPHERICAL ABERRATION

NA=0.47

-0.001  0  0.001

ASTIGMATISM y=0.0126

— SAGITTAL RAYS
--- MERIDIONAL RAYS

-0.001  0  0.001

DISTORTION y=0.0126

-0.1  0  0.1(%)

MERIDIONAL COMA y=0.0126 y=0.0

FIG. 9A
SPHERICAL ABERRATION
FIG. 9B
ASTIGMATISM
FIG. 9C
DISTORTION
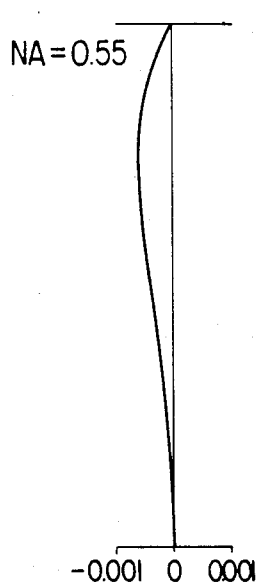
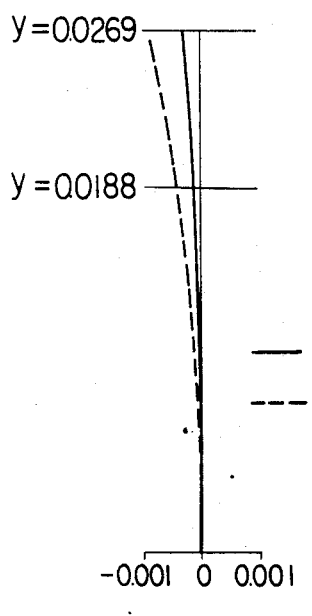
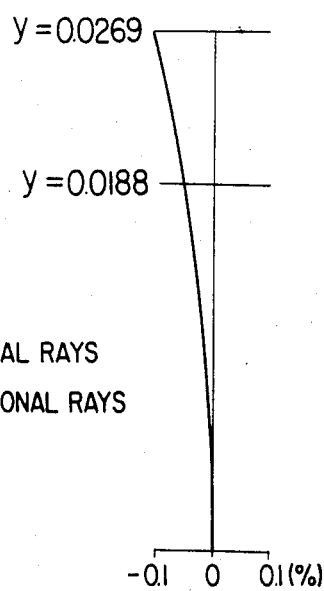
FIG. 9D
MERIDIONAL COMA
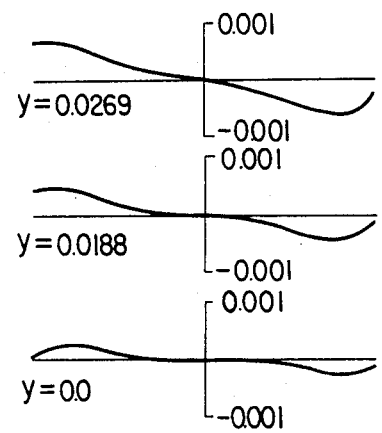

OBJECTIVE LENS FOR AN OPTICAL DISC

BACKGROUND OF THE INVENTION

1. Field of the Invention

The present invention relates to an objective lens, and more particularly to an objective lens for an optical disc.

2. Description of the Prior Art

An objective lens which is used for treating optical signals on an optical disc is used to record on the disc at high recording density and to reproduce the recorded signals. For practical use with a semiconductor laser, high resolving power on the order of a numerical aperture of 0.45 to 0.5 is needed for an objective lens for reproduction, while high resolving power on the order of N.A. of 0.55 to 0.6 is required for an objective lens for recording. As for an objective lens for reproduction, one for a digital audio disc or one for a video disc has been well known. However, the correction of such off-axis aberration as astigmatism is insufficient generally. As for an objective lens for recording, one for an optical disc file system or one for an optical magnetic disc has been well known. However, due to a great numerical aperture (N.A.) working distance is very small and many lenses are required.

SUMMARY OF THE INVENTION

An object of the present invention is to provide an objective lens for an optical disc for recording or reproducing having a relatively simple three-group four-lens structure of, a numerical aperture of 0.45 to 0.6 and long working distance and yet having a good correction of off-axis aberration.

BRIEF DESCRIPTION OF THE DRAWINGS

FIGS. 3A, 3B, 3C, 3D, to FIGS. 9A, 9B, 9C, 9D show various aberration graphs of first to seventh embodiments, respectively.

DETAILED DESCRIPTION OF THE PREFERRED EMBODIMENTS

Figure 1:
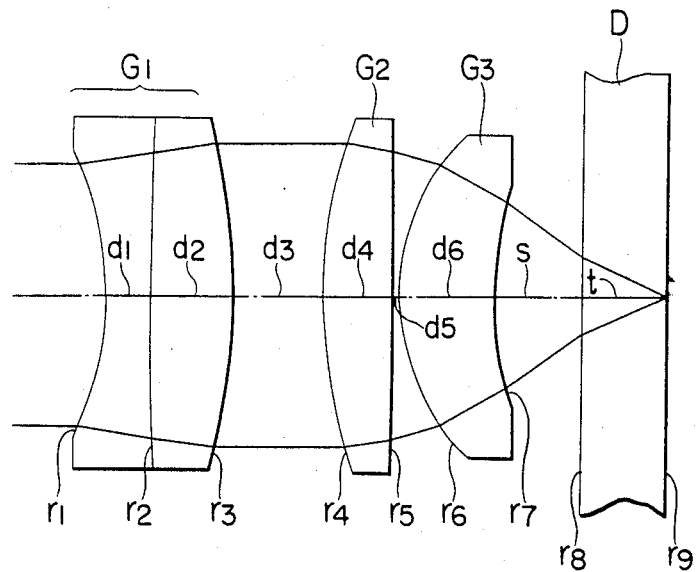
FIG. 1 shows a lens arrangement of a first embodiment according to the present invention.

Specifically, an objective lens according to the present invention comprises, in succession from the farther conjugate point side of the objective lens, a first lens member $G_1$ consisting of a negative lens having a concave surface directed toward the farther conjugate point side and a positive lens cemented together, a second lens member $G_2$ consisting of a positive lens having a sharper surface of curvature directed toward the farther conjugate point side, and a third lens member $G_3$ consisting of a positive meniscus lens having a convex surface directed toward the farther conjugate point side. The objective lens further satisfies the following conditions.

$$-0.02 < \frac{f}{f_1} < 0.07 \quad (1)$$

$$0.12 < n_2 - n_1 \quad (2)$$

$$\frac{d_3}{f} < 1.0 \quad (3)$$

$$0.7 < \frac{f_2}{f_3} < 1.5 \quad (4)$$

wherein the focal distances of the first, second and third lens members are designated by $f_1$, $f_2$, $f_3$, respectively; the focal distance of the entire system is designated by $f$; $n_1$, $n_2$ represent refractive indexes of the negative lens and the positive lens in the first lens member for the wavelength in use; and $d_3$ represents air spacing between the first and second lens members.

Generally in such an objective lens as in the present invention, an optical disc is positioned at the nearer conjugate point side and luminous flux for recording or reproducing is supplied from the farther conjugate point side so that incident flux is condensed on the optical disc surface.

And generally on the optical disc what is called a cover glass D having a predetermined thickness is provided generally for protecting an information recorded surface. Accordingly, correction of the various aberrations is effected inclusively of the cover glass. The working distance is designed as a value corresponding to the distance between the final lens surface of the objective lens and the cover glass. The first lens member of the present invention consisting of the negative and positive lenses has its concave surface directed toward the farther conjugate point side and if the case where luminous flux enters from the farther conjugate point side is considered, the concave surface as the foremost surface plays a major role in correcting of various aberrations, in particular curvature of field at the image surface (disc surface) $r_9$ and in securing long working distance. Specifically, the Petzval sum is broadly corrected by the divergent action of the negative lens in the first lens member, particularly at the first surface $r_1$. Concurrently, this divergent surface contributes good correction of spherical aberration. Further, since entrance rays are refracted from the optical axis to a higher position by the divergent action at the first surface $r_1$, it is advantageous for keeping the back focal distance sufficiently long, so that a working distance from about 0.4 to about 0.8 times longer than the focal distance of the entire system can be secured.

Conditions according to the present invention as stated above are described in detail in the following.

Condition (1) prescribes the refractive power of the first lens member $G_1$ as a cemented lens. If the upper limit is exceeded, the positive refractive power of the first lens member is too strong and therefore, the entrance height to the second lens member is low and it is difficult to secure a desirable working distance. Reversely, if the lower limit of condition (1) is exceeded, the entrance height to the second lens member $G_2$ is great. The result is that high-order spherical aberration having great under-correction is treated in the second lens member and the other conditions can not correct this high-order spherical aberration.

On the other hand, because of the refractive power of the first lens member $G_1$ being small, the positive refractive powers of the second and third lens members are inevitably great and therefore, the occurrences of negative spherical aberrations in the second and third lens members are not avoidable.

The condition for correcting this is condition (2). If the difference in refractive index between the glasses constituting the first lens member $G_1$ is small and outside of the condition (2), it is difficult to well correct this spherical aberration.

The condition (3) is one for shortening the entire length and keeping coma proper in order that the sine condition is not over-corrected. If the upper limit is exceeded, it is useful for correcting astigmatism, but the sine condition is over corrected and the entire length is longer so that entire weight inclusive of a lens barrel is increased. Therefore, it is disadvantageous for compactness and reduction in weight. The condition (4) is for keeping astigmatism good. If the range is exceeded, either of refractive powers is too great so that evenness of image surface is lost.

In the structure as stated above, it is desirable to satisfy the following condition and therefore, it is possible to well attain the object of the present invention.

$$0.6 < \frac{r_1}{f} < 1.5 \qquad (5)$$

wherein $r_1$ represents radius of curvature of the foremost lens surface in the first lens member whose concave surface is directed toward the farther conjugate point side.

Although it is possible sufficiently to separate the negative lens in the first lens member from the positive lens in the first group with respect to aberration compensation, it is necessary to cement the two lenses together in order to prevent deterioration of imaging performance owing to eccentricity in the production stage. Therefore, according to the present invention, high performance can be kept stable even in production. In the present invention, no special consideration is paid with respect to chromatic aberration. However, it is sufficiently possible to apply a well-known achromatic method by a combination of optical materials having various dispersion values. This is not outside of the scope of the present invention.

Figure 2:
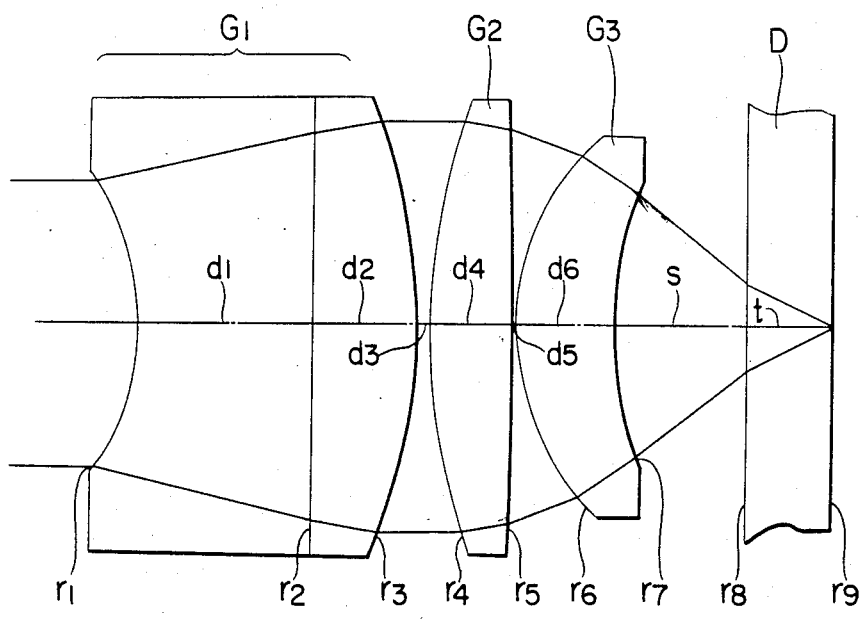
FIG. 2 shows a lens arrangement of a fourth embodiment.
Figures 7A, 7B, 7C:
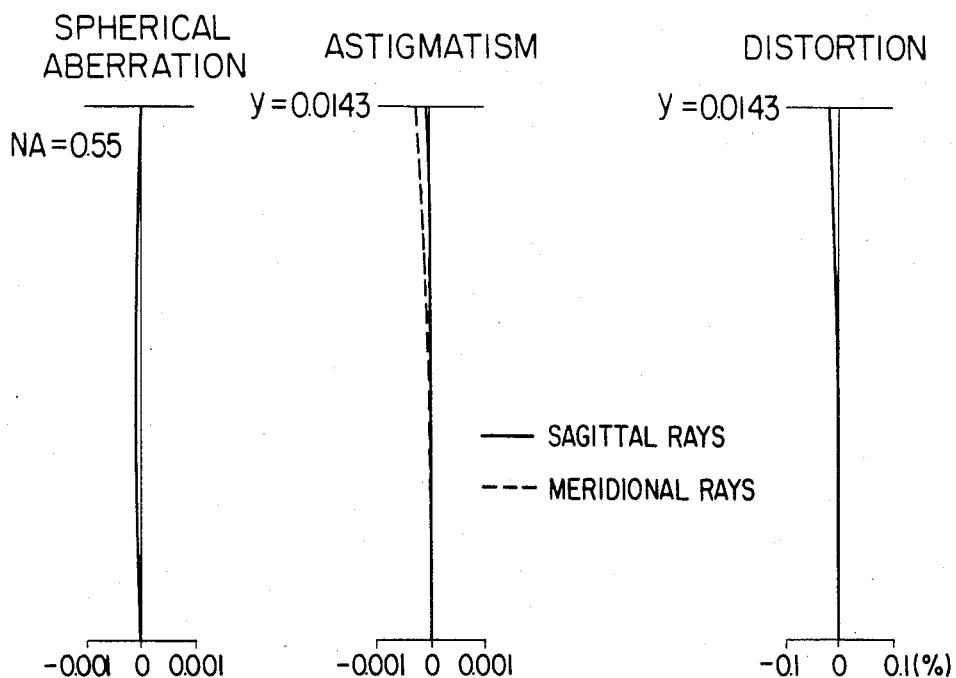
Figure 7D:
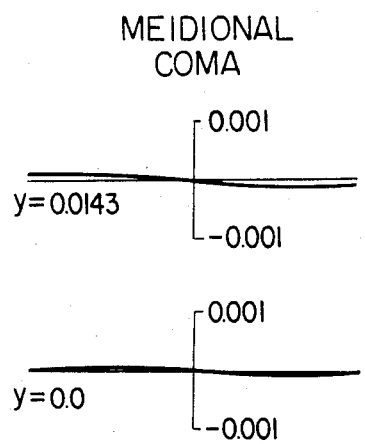
Figure 8A:
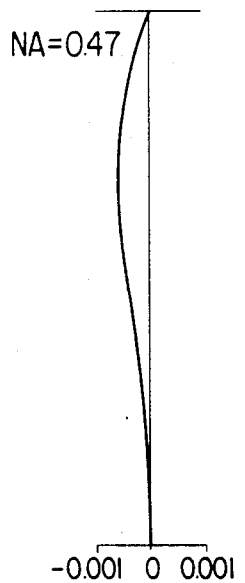
Figure 8B:
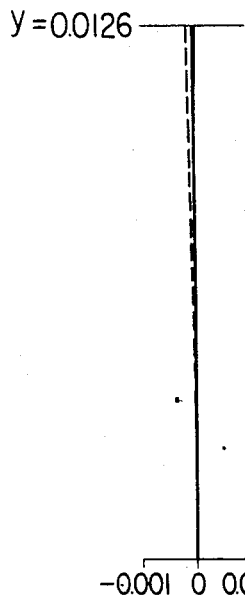
Figure 8C:
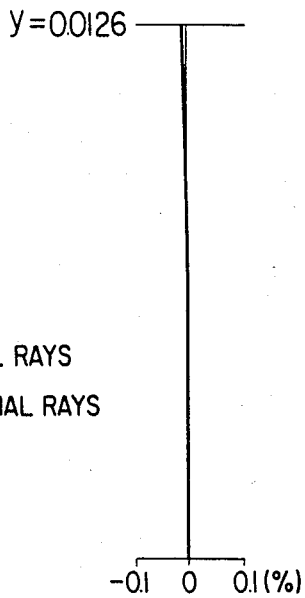
Figure 8D:
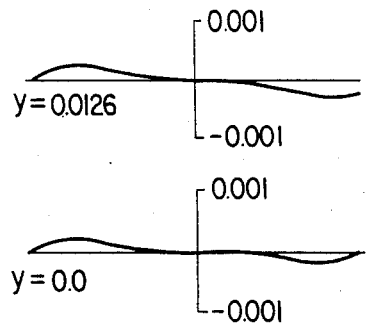

Some embodiments according to the present invention are described in the following. Each of the embodiments is of what is called a three-group four-lens structure and the brightness of numerical aperture is on the order of 0.45 to 0.6. In each of the embodiments, correction of aberration inclusive of a plane parallel plate as a cover glass D made of acryl resin having a predetermined thickness t and refractive index n of 1.50 is effected. A distance s from the final lens surface $r_7$ to the cover glass D corresponds to actual working distance and secures the size of 0.4 times to 0.7 times or more as long as the entire focal distance f. FIG. 1 is a lens arrangement of the first embodiment. FIG. 2 is a lens arrangement of the fourth embodiment. In each of the figures, for the purpose of assisting understanding of the structure of the present invention, marginal rays from an infinite object point on axis are shown.

Numerical data in the first to the seventh embodiments are shown in the following tables. In each of tables $r_1, r_2, r_3, \ldots$ represent radii of curvature of individual lens surfaces in succession from the farther conjugate point side; $d_1, d_2, d_3, \ldots$ represent center thicknesses of individual lenses and spacings between lenses; $n_1, n_2, \ldots$ represent refractive indexes of individual lenses for a wavelength λ of 830 nm. It is noted that $f_1$, $f_2$, $f_3$ represent the focal distance of the first, second and third lens members, respectively.

FIRST EMBODIMENT

Focal distance of entire system f = 1.0 N.A. = 0.55
s = 0.4076 t = 0.4027

| | | | |
|---|---|---|---|
| $r_1 = -1.3504$ | $d_1 = 0.2013$ | $n_1 = 1.49434$ | ⎫ |
| $r_2 = 11.6239$ | $d_2 = 0.3758$ | $n_2 = 1.78151$ | ⎬ $G_1$ |
| $r_3 = -2.5831$ | $d_3 = 0.4161$ | | ⎭ |
| $r_4 = 1.9454$ | $d_4 = 0.3221$ | $n_3 = 1.78151$ | $G_2$ |
| $r_5 = 84.6826$ | $d_5 = 0.0268$ | | |
| $r_6 = 0.8590$ | $d_6 = 0.4564$ | $n_4 = 1.78151$ | $G_3$ |
| $r_7 = 1.4067$ | | | |

$f_1 = -1029.03$
$f_2 = 2.54$
$f_3 = 2.07$

SECOND EMBODIMENT

Focal distance of entire system f = 1.0 N.A. = 0.5
s = 0.4968 t = 0.3333

| | | | |
|---|---|---|---|
| $r_1 = -1.2711$ | $d_1 = 0.1667$ | $n_1 = 1.49434$ | ⎫ |
| $r_2 = 10.4394$ | $d_2 = 0.3111$ | $n_2 = 1.78151$ | ⎬ $G_1$ |
| $r_3 = -2.3316$ | $d_3 = 0.1829$ | | ⎭ |
| $r_4 = 1.8579$ | $d_4 = 0.2667$ | $n_3 = 1.78151$ | $G_2$ |
| $r_5 = 49.8160$ | $d_5 = 0.0222$ | | |
| $r_6 = 0.8201$ | $d_6 = 0.3778$ | $n_4 = 1.78151$ | $G_3$ |
| $r_7 = 1.2952$ | | | |

$f_1 = 94.38$
$f_2 = 2.46$
$f_3 = 2.12$

THIRD EMBODIMENT

Focal distance of entire system f = 1.0 N.A. = 0.55
s = 0.4100 t = 0.4021

| | | | |
|---|---|---|---|
| $r_1 = -1.2476$ | $d_1 = 0.2011$ | $n_1 = 1.64269$ | ⎫ |
| $r_2 = 7.3915$ | $d_2 = 0.3753$ | $n_2 = 1.78151$ | ⎬ $G_1$ |
| $r_3 = -1.8224$ | $d_3 = 0.4156$ | | ⎭ |
| $r_4 = 1.8518$ | $d_4 = 0.3217$ | $n_3 = 1.78151$ | $G_2$ |
| $r_5 = 114.1643$ | $d_5 = 0.0268$ | | |
| $r_6 = 0.8206$ | $d_6 = 0.4558$ | $n_4 = 1.78151$ | $G_3$ |
| $r_7 = 1.0568$ | | | |

$f_1 = 183.89$
$f_2 = 2.41$
$f_3 = 2.54$

FOURTH EMBODIMENT

Focal distance of entire system f = 1.0 N.A. = 0.6
s = 0.6189 t = 0.4000

| | | | |
|---|---|---|---|
| $r_1 = -1.0641$ | $d_1 = 0.8000$ | $n_1 = 1.49435$ | ⎫ |
| $r_2 = -102.6990$ | $d_2 = 0.4800$ | $n_2 = 1.78151$ | ⎬ $G_1$ |
| $r_3 = -2.1606$ | $d_3 = 0.5333$ | | ⎭ |
| $r_4 = 2.4466$ | $d_4 = 0.3733$ | $n_3 = 1.78151$ | $G_2$ |
| $r_5 = -36.5010$ | $d_5 = 0.0267$ | | |
| $r_6 = 1.0019$ | $d_6 = 0.4533$ | $n_4 = 1.78151$ | $G_3$ |
| $r_7 = 1.4431$ | | | |

$f_1 = 34.22$
$f_2 = 2.95$
$f_3 = 2.85$

FIFTH EMBODIMENT

Focal distance of entire system f = 1.0 N.A. = 0.55
s = 0.53685 t = 0.3423

| | | | |
|---|---|---|---|
| $r_1 = -1.1410$ | $d_1 = 0.1997$ | $n_1 = 1.51024$ | $G_1$ |
| $r_2 = 4.4705$ | $d_2 = 0.3423$ | $n_2 = 1.78151$ | |
| $r_3 = -2.0367$ | $d_3 = 0.0285$ | | |
| $r_4 = 1.6987$ | $d_4 = 0.2853$ | $n_3 = 1.78151$ | $G_2$ |
| $r_5 = 12.8603$ | $d_5 = 0.0285$ | | |
| $r_6 = 0.8281$ | $d_6 = 0.3138$ | $n_4 = 1.78151$ | $G_3$ |
| $r_7 = 1.2551$ | | | |

$f_1 = 19.34$
$f_2 = 2.48$
$f_3 = 2.36$

SIXTH EMBODIMENT

Focal distance of entire system f = 1.0 N.A. = 0.47
s = 0.7755 t = 0.0756

| | | | |
|---|---|---|---|
| $r_1 = -0.83367$ | $d_1 = 0.1763$ | $n_1 = 1.51024$ | $G_1$ |
| $r_2 = -9.5244$ | $d_2 = 0.3022$ | $n_2 = 1.78151$ | |
| $r_3 = -1.3876$ | $d_3 = 0.0252$ | | |
| $r_4 = 2.0184$ | $d_4 = 0.2771$ | $n_3 = 1.78151$ | $G_2$ |
| $r_5 = -13.52442$ | $d_5 = 0.0252$ | | |
| $r_6 = 0.8332$ | $d_6 = 0.3022$ | $n_4 = 1.78151$ | $G_3$ |
| $r_7 = 1.1384$ | | | |

$f_1 = 44.90$
$f_2 = 2.27$
$f_3 = 2.77$

SEVENTH EMBODIMENT

Focal distance of entire system f = 1.0 N.A. = 0.55
s = 0.4210 t = 0.3217

| | | | |
|---|---|---|---|
| $r_1 = -1.3486$ | $d_1 = 0.2011$ | $n_1 = 1.57074$ | $G_1$ |
| $r_2 = 32.4115$ | $d_2 = 0.3753$ | $n_2 = 1.78151$ | |
| $r_3 = -2.0382$ | $d_3 = 0.7507$ | | |
| $r_4 = 1.7826$ | $d_4 = 0.3217$ | $n_3 = 1.78151$ | $G_2$ |
| $r_5 = 21.0971$ | $d_5 = 0.0268$ | | |
| $r_6 = 0.7768$ | $d_6 = 0.4558$ | $n_4 = 1.78151$ | $G_3$ |
| $r_7 = 0.9873$ | | | |

$f_1 = 46.54$
$f_2 = 2.47$
$f_3 = 2.39$

Various aberration graphs of the first to seventh embodiments are shown in FIGS. 3A, 3B, 3C and 3D to 9A, 9B, 9C and 9D, respectively. In each of aberration graphs, spherical aberration (A), Astigmatism (B), Distortion (C), and Meridional Coma (D) are shown. The curved line of the image height at y=0 in the meridional coma is what is called lateral spherical aberration and is compared in connection with the balance between this and coma. It is obvious from each of the aberration graphs that each of the embodiments is bright and yet has an excellent performance while having long working distance.

According to the present invention as in the foregoing, an objective lens of excellent performance while having few lenses, large N.A. and long working distance is obtained and further an objective lens of less deterioration of performance due to eccentricity of each lens in production is obtained.

The objective lens according to the present invention can be used not only for recording or reproducing, but also as a collimater for converting luminous flux from light source into parallel rays.

I claim:

1. An objective lens for recording or reproducing information on a optical disc at high density comprising, in succession from the farther conjugate point side of the objective lens toward the nearer conjugate point side thereof;

a first lens member consisting of a negative lens whose concave surface is directed toward the farther conjugate point side and a positive lens cemented together, a second lens member consisting of a positive lens, and a third lens member consisting of a positive meniscus lens whose convex surface is directed toward the farther conjugate point side, and said objective lens satisfying the following conditions:

$d_3/f < 1.0$ $0.12 < n_2 - n_1$ $-0.02 < f/f_1 < 0.07$ $0.7 < f_2/f_3 < 1.5$ $0.6 < r_1/f < 1.5$ wherein d3 represents air spacing between the first and second lens members; f represents focal distance of the entire system; n1 and n2 represent refractive indicas of the negative lens and the positive lens in the first lens member for the wavelength in use; $f_1$, $f_2$ and $f_3$ represent focal distances of the first, second and third lens members, respectively; and $r_1$ represents radius of curvature of the foremost lens surface of the first lens member whose concave surface is directed toward the farther conjugate point side.

2. An objective lens according to claim 1, having the numerical data substantially as set forth in the following table.

f = 1.0 N.A. = 0.55
s = 0.04076 t = 0.4027

| | | | |
|---|---|---|---|
| $r_1 = -1.3504$ | $d_1 = 0.2013$ | $n_1 = 1.49434$ | $G_1$ |
| $r_2 = 11.6239$ | $d_2 = 0.3758$ | $n_2 = 1.78151$ | |
| $r_3 = -2.5831$ | $d_3 = 0.4161$ | | |
| $r_4 = 1.9454$ | $d_4 = 0.3221$ | $n_3 = 1.78151$ | $G_2$ |
| $r_5 = 84.6826$ | $d_5 = 0.0268$ | | |
| $r_6 = 0.8590$ | $d_6 = 0.4564$ | $n_4 = 1.78151$ | $G_3$ |
| $r_7 = 1.4067$ | | | |

$f_1 = -1029.03$
$f_2 = 2.54$
$f_3 = 2.07$ wherein $r_1$, $r_2$, $r_3$, . . . represent radii of curvature of individual lens surfaces in succession from the farther conjugate point side; $d_1$, $d_2$, $d_3$, . . . represent center thicknesses of individual lenses and spacings between lenses; $n_1$, $n_2$, $n_3$ . . . represent refractive indexes of individual lenses for wavelength of 830 nm; $f_1$, $f_2$, $f_3$ represent the focal distance of the first, second and third lens members, respectively; f represents focal distance of the entire system; s represents a distance from final lens surface $r_7$ to a cover glass D; and t represents a thickness of the cover glass D.

3. An objective lens according to claim 1, having the numerical data substantially as set forth in the following table.

| | f = 1.0 N.A. = 0.5 | | |
|---|---|---|---|
| | s = 0.4968 t = 0.3333 | | |
| $r_1 = -1.2711$ | $d_1 = 0.1667$ | $n_1 = 1.49434$ | ⎫ |
| $r_2 = 10.4394$ | $d_2 = 0.3111$ | $n_2 = 1.78151$ | ⎬ $G_1$ |
| $r_3 = -2.3316$ | $d_3 = 0.1829$ | | ⎭ |
| $r_4 = 1.8579$ | $d_4 = 0.2667$ | $n_3 = 1.78151$ | $G_2$ |
| $r_5 = 49.8160$ | $d_5 = 0.0222$ | | |
| $r_6 = 0.8201$ | $d_6 = 0.3778$ | $n_4 = 1.78151$ | $G_3$ |
| $r_7 = 1.2952$ | | | |
| | $f_1 = 94.38$ | | |
| | $f_2 = 2.46$ | | |
| | $f_3 = 2.12$ | | | wherein $r_1$, $r_2$, $r_3$, . . . represent radii of curvature of individual lens surfaces in succession from the farther conjugate point side; $d_1$, $d_2$, $d_3$, . . . represent center thicknesses of individual lenses and spacings between lenses; $n_1$, $n_2$, . . . represent refractive indexes of individual lenses for wavelength of 830 nm; $f_1$, $f_2$, $f_3$ represent the focal distance of the first, second and third lens members, respectively; f represents focal distance of the entire system; s represents a distance from final lens surface $r_7$ to a cover glass D; and t represents a thickness of the cover glass D.

4. An objective lens according to claim 1, having the numerical data substantially as set forth in the following table.

| | f = 1.0 N.A. = 0.55 | | |
|---|---|---|---|
| | s = 0.4100 t = 0.4021 | | |
| $r_1 = -1.2476$ | $d_1 = 0.2011$ | $n_1 = 1.64269$ | ⎫ |
| $r_2 = 7.3915$ | $d_2 = 0.3753$ | $n_2 = 1.78151$ | ⎬ $G_1$ |
| $r_3 = -1.8224$ | $d_3 = 0.4156$ | | ⎭ |
| $r_4 = 1.8518$ | $d_4 = 0.3217$ | $n_3 = 1.78151$ | $G_2$ |
| $r_5 = 114.1643$ | $d_5 = 0.0268$ | | |
| $r_6 = 0.8206$ | $d_6 = 0.4558$ | $n_4 = 1.78151$ | $G_3$ |
| $r_7 = 1.0568$ | | | |
| | $f_1 = 183.89$ | | |
| | $f_2 = 2.41$ | | |
| | $f_3 = 2.54$ | | | wherein $r_1$, $r_2$, $r_3$, . . . represent radii of curvature of individual lens surfaces in succession from the farther conjugate point side; $d_1$, $d_2$, $d_3$, . . . represent center thicknesses of individual lens and spacings between lenses; $n_1$, $n_2$, . . . represent refractive indexes of individual lenses for wavelength of 830 nm; $f_1$, $f_2$, $f_3$ represent the focal distance of the first, second and third lens members, respectively; f represents focal distance of the entire system; s represents a distance from final lens surface $r_7$ to a cover glass D; and t represents a thickness of the cover glass D.

5. An objective lens according to claim 1, having the numerical data substantially as set forth in the following table.

| | f = 1.0 N.A. = 0.6 | | |
|---|---|---|---|
| | s = 0.6189 t = 0.4000 | | |
| $r_1 = -1.0641$ | $d_1 = 0.8000$ | $n_1 = 1.49435$ | ⎫ |
| $r_2 = -102.6990$ | $d_2 = 0.4800$ | $n_2 = 1.78151$ | ⎬ $G_1$ |
| $r_3 = -2.1606$ | $d_3 = 0.5333$ | | ⎭ |
| $r_4 = 2.4466$ | $d_4 = 0.3733$ | $n_3 = 1.78151$ | $G_2$ |
| $r_5 = -36.5010$ | $d_5 = 0.0267$ | | |
| $r_6 = 1.0019$ | $d_6 = 0.4533$ | $n_4 = 1.78151$ | $G_3$ |
| $r_7 = 1.4431$ | | | |
| | $f_1 = 34.22$ | | |
| | $f_2 = 2.95$ | | |
| | $f_3 = 2.85$ | | | wherein $r_1$, $r_2$, $r_3$, represent radii of curvature of individual lens surfaces in succession from the farther conjugate point side; $d_1$, $d_2$, $d_3$, . . . represent center thicknesses of individual lenses and spacings between lenses; $n_1$, $n_2$, . . . represent refractive indexes of individual lenses for wavelength of 830 nm; $f_1$, $f_2$, $f_3$ represent the focal distance of the first, second and third lens members, respectively; f represents focal distance of the entire system; s represents a distance from final lens surface $r_7$ to a cover glass D; and t represents a thickness of the cover glass D.

6. An objective lens according to claim 1, having the numerical data substantially as set forth in the following table.

| | f = 1.0 N.A. = 0.55 | | |
|---|---|---|---|
| | s = 0.53685 t = 0.3423 | | |
| $r_1 = -1.1410$ | $d_1 = 0.1997$ | $n_1 = 1.51024$ | ⎫ |
| $r_2 = 4.4705$ | $d_2 = 0.3423$ | $n_2 = 1.78151$ | ⎬ $G_1$ |
| $r_3 = -2.0367$ | $d_3 = 0.0285$ | | ⎭ |
| $r_4 = 1.6987$ | $d_4 = 0.2853$ | $n_3 = 1.78151$ | $G_2$ |
| $r_5 = 12.8603$ | $d_5 = 0.0285$ | | |
| $r_6 = 0.8281$ | $d_6 = 0.3138$ | $n_4 = 1.78151$ | $G_3$ |
| $r_7 = 1.2551$ | | | |
| | $f_1 = 19.34$ | | |
| | $f_2 = 2.48$ | | |
| | $f_3 = 2.36$ | | | wherein $r_1$, $r_2$, $r_3$, . . . represent radii of curvature of individual lens surfaces in succession from the farther conjugate point side; $d_1$, $d_2$, $d_3$, . . . represent center thicknesses of individual lenses and spacings between lenses; $n_1$, $n_2$, . . . represent refractive indexes of individual lenses for wavelength of 830 nm; $f_1$, $f_2$, $f_3$ represent the focal distance of the first, second and third lens members, respectively; f represents focal distance of the entire system; s represents a distance from final lens surface $r_7$ to a cover glass D; and t represents a thickness of the cover glass D.

7. An objective lens according to claim 1, having the numerical data substantially as set forth in the following table.

| | f = 1.0 N.A. = 0.47 | | |
|---|---|---|---|
| | s = 0.7755 t = 0.0756 | | |
| $r_1 = -0.83367$ | $d_1 = 0.1763$ | $n_1 = 1.51024$ | ⎫ |
| $r_2 = -9.5244$ | $d_2 = 0.3022$ | $n_2 = 1.78151$ | ⎬ $G_1$ |
| $r_3 = -1.3876$ | $d_3 = 0.0252$ | | ⎭ |
| $r_4 = 2.0184$ | $d_4 = 0.2771$ | $n_3 = 1.78151$ | $G_2$ |
| $r_5 = -13.52442$ | $d_5 = 0.0252$ | | |
| $r_6 = 0.8332$ | $d_6 = 0.3022$ | $n_4 = 1.78151$ | $G_3$ |
| $r_7 = 1.1384$ | | | |
| | $f_1 = 44.90$ | | |
| | $f_2 = 2.27$ | | |
| | $f_3 = 2.77$ | | | wherein $r_1$, $r_2$, $r_3$, . . . represent radii of curvature of individual lens surfaces in succession from the farther conjugate point side; $d_1$, $d_2$, $d_3$, ... represent center thicknesses of individual lenses and spacings between lenses; $n_1$, $n_2$, ... represent refractive indexes of individual lenses for wavelength of 830 nm; $f_1$, $f_2$, $f_3$ represent the focal distance of the first, second and third lens members, respectively; f represents focal distance of the entire system; s represents a distance from final lens surface $r_7$ to a cover glass D; and t represents a thickness of the cover glass D.

8. An objective lens according to claim 1, having the numerical data substantially as set forth in the following table.

| | f = 1.0 N.A. = 0.55 | | | |
|---|---|---|---|---|
| | s = 0.4210 t = 0.3217 | | | |
| $r_1 = -1.3486$ | $d_1 = 0.2011$ | $n_1 = 1.57074$ | | $G_1$ |
| $r_2 = 32.4115$ | $d_2 = 0.3753$ | $n_2 = 1.78151$ | | |

| -continued | | | |
|---|---|---|---|
| f = 1.0 N.A. = 0.55 | | | |
| s = 0.4210 t = 0.3217 | | | |
| $r_3 = -2.0382$ | $d_3 = 0.7507$ | | |
| $r_4 = 1.7826$ | $d_4 = 0.3217$ | $n_3 = 1.78151$ | $G_2$ |
| $r_5 = 21.0971$ | $d_5 = 0.0268$ | | |
| $r_6 = 0.7768$ | $d_6 = 0.4558$ | $n_4 = 1.78151$ | $G_3$ |
| $r_7 = 0.9873$ | | | |
| | $f_1 = 46.54$ | | |
| | $f_2 = 2.47$ | | |
| | $f_3 = 2.39$ | | | wherein $r_1$, $r_2$, $r_3$, ... represent radii of curvature of individual lens surfaces in succession from the farther conjugate point side; $d_1$, $d_2$, $d_3$, ... represent center thicknesses of individual lenses and spacings between lenses; $n_1$, $n_2$, ... represent refractive indexes of individual lenses for wavelength of 830 nm; $f_1$, $f_2$, $f_3$ represent the focal distance of the first, second and third lens members, respectively; f represents focal distance of the entire system; s represents a distance from final lens surface $r_7$ to a cover glass D; and t represents a thickness of the cover glass D.

* * * * *